(12) United States Patent
Heuer et al.

(10) Patent No.: US 7,468,158 B2
(45) Date of Patent: Dec. 23, 2008

(54) CORROSION INHIBITOR FOR PROTECTING METALLIC MATERIALS IN STRONGLY ALKALINE MEDIUM

(75) Inventors: Lutz Heuer, Dormagen (DE); Stylianos Savakis, Köln (DE); Helmut Diekmann, Burscheid (DE); Eberhard Zirngiebl, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 729 days.

(21) Appl. No.: 10/349,756

(22) Filed: Jan. 23, 2003

(65) Prior Publication Data
US 2003/0152479 A1   Aug. 14, 2003

(30) Foreign Application Priority Data
Jan. 29, 2002   (DE)   ................................ 102 03 329

(51) Int. Cl.
*C23F 11/06*   (2006.01)
(52) U.S. Cl. ............................................ 422/13; 422/7
(58) Field of Classification Search .................. 422/13, 422/7; 508/291
See application file for complete search history.

(56) References Cited

U.S. PATENT DOCUMENTS

| | | | | |
|---|---|---|---|---|
| 3,732,347 A | * | 5/1973 | Mitchell | 264/231 |
| 4,282,178 A | | 8/1981 | Khare et al. | 422/13 |
| 4,289,645 A | | 9/1981 | Muccitelli et al. | 252/178 |
| 4,476,930 A | * | 10/1984 | Watanabe | 166/279 |
| 4,657,740 A | | 4/1987 | Feldman | 422/13 |
| 4,693,866 A | | 9/1987 | Feldman | 422/13 |
| 4,980,128 A | * | 12/1990 | Cuisia et al. | 422/16 |
| 5,830,383 A | * | 11/1998 | Greaves et al. | 252/188.28 |
| 6,140,280 A | * | 10/2000 | Nakano et al. | 508/291 |

OTHER PUBLICATIONS

Patent Abstracts of Japan, JP 63130785 A, Jun. 2, 1988, Minami Takao et al, "Method for Preventing Intergranular Stress Corrosion Cracking of Ni-Based Alloy".
Patent Abstracts of Japan, JP 63216984 A, Sep. 9, 1988, Yuki Hideaki et al, "Method for Preventing Intergranular Damage of Ni Alloy Member".

* cited by examiner

*Primary Examiner*—Jill Warden
*Assistant Examiner*—Sean E. Conley
(74) *Attorney, Agent, or Firm*—Michael A. Miller

(57) ABSTRACT

Corrosion inhibitor and method of protecting metallic materials in strongly alkaline medium by means of a corrosion inhibitor, characterized in that it contains an amine containing at least one CH group bound to the nitrogen.

2 Claims, No Drawings

CORROSION INHIBITOR FOR PROTECTING METALLIC MATERIALS IN STRONGLY ALKALINE MEDIUM

BACKGROUND OF THE INVENTION

1. Field of the Invention

The invention relates to a novel corrosion inhibitor and its use for protecting metallic materials in strongly alkaline medium.

2. Brief Description of the Prior Art

It is known that metallic materials, depending on temperature, pressure and composition, are corroded both by acidic media and by alkaline media. To ensure reliable operation in chemical plants or elsewhere, corrosion rates are therefore determined in laboratory experiments and later checked by measurements on the plant when in operation. Values based on experience set the limits for estimating whether construction of a plant from a certain metallic material is appropriate or what the maintenance interval should be.

In the case of extreme conditions, e.g. elevated temperatures above 50° C. and/or presence of concentrated acidic or alkaline media having a pH of >13, the search for and selection of a suitable metallic material is not easy. Although materials coated on the inside (enamel) are often used in the case of acidic media, this is not possible in the case of alkaline media since enamel is corroded by alkali. During the lifetime of a plant, this leads to costly maintenance or to shutdown of the plant.

Illustrative of the strongly alkaline medium of concern here is sodium hydroxide e prepared by various processes which give differing concentrations in aqueous solutions or melts. Examples are the diaphragm, membrane and amalgam processes. A comparable situation applies to the preparation of potassium hydroxide or other strongly alkaline solutions of alkali metal hydroxides or alkaline earth metal hydroxides. If the concentration of the aqueous sodium hydroxide obtained in the process is too low, it is increased by evaporation. The concentration of NaOH in the membrane process is about 30%. However, the normal commercial concentration of NaOH is about 50%.

Evaporation of NaOH solutions to bring the concentration from 30% to a higher concentration is, therefore, necessary. There are few metallic materials which can safely withstand this evaporation with acceptable damage in this (high-temperature) process. Materials which may be mentioned include, for example, stainless steels or other alloy steels. However, if the sodium hydroxide solution contains, as a result of the process, amounts of chlorate or other oxidants such as oxygen or $Fe^{3+}$ in the ppm range, the corrosion is considerably increased and operation of an evaporation plant becomes more difficult and more expensive. This applies to plants which are to be operated using membrane alkali or diaphragm alkali. The former contains up to 50 ppm of chlorate, the latter up to 5000 ppm of chlorate. An evaporation plant can then no longer be operated economically because of the increased corrosion or can give concentrations of only up to about 50%, since the process is temperature-dependent. Furthermore, the corrosion leads to the contamination of the sodium hydroxide with metal ions, mostly nickel, manganese, chromium or the like, in each case depending on the metallic material used for the plant. These impurities can then adversely affect or prevent subsequent chemicals or other processes. In virtually all cases, these ions are discharged into the environment sooner or later, which is not desirable.

It is an object of the invention to provide a method which considerably reduces the corrosion of metallic materials by strongly alkaline media, in particular media containing sodium hydroxide.

SUMMARY OF THE INVENTION

The invention provides a corrosion inhibitor, characterized in that it contains an amine containing at least one CH group bound to the nitrogen or a salt thereof. Examples, which do not constitute an exhaustive listing, are propylenamines and benzylamines such as benzylamine, dibenzylamine, tribenzylamine, methylbenzylamine of the formula (I)

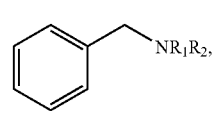
(I)

where
$R_1$ is a $C_1$-$C_6$-alkyl radical, H or a benzyl radical and
$R_2$ is a $C_1$-$C_6$-alkyl radical, H or a benzyl radical,
where the benzyl radicals may bear further substituents, in particular $C_1$-$C_6$-alkyl or a halogen such as chlorine.

DETAILED DESCRIPTION OF THE INVENTION

The invention is described more fully hereunder with particular reference to its preferred embodiments. Preference is given to using polyamines selected from the group consisting of the reaction products of dichloroethane with ammonia and/or other amines or from the group consisting of the reaction products of ethylene oxide with ammonia or other amines. These products are generally water-soluble/water-miscible liquids or solid hydrates.

Particular preference is given to using polyamines which are removed from the process stream during the evaporation process as a result of their volatility in steam or have such a low volatility in steam that they are not found or found only in very low concentrations in the condensate from the evaporation. For the purposes of the present invention, polyamines are compounds which comprise a saturated hydrocarbon chain with terminal amine functions, interrupted by a variable number of secondary and/or tertiary and/or quaternary amino functions. Very particular preference is given to polyamines which have one of the formulae (II) and (III) below

(II),

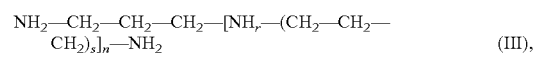
(III), where
n is 0 or an integer from 1 to 300,
p, q, s and t are each 1 or 2, and
r is 0 or 1,
where the sum of the substituents on the respective nitrogen is three or
an anion An is additionally present to balance the charge when the nitrogen is bound to 4 substituents. Preferred anions are, in particular, chloride, sulphate or nitrate.

The polyamines can be uncharged or ionic, in particular due to quaternary nitrogen (tetrasubstituted nitrogen). Counterions are then chloride, sulphate, nitrate or other anions. They can also be crosslinked or branched by means of further reagents, e.g. by subsequent reactions with dichloroethane, ethyleneimine or acrylonitrile, if appropriate with subsequent reduction.

Preference is also given to nitrogen-containing heterocycles, in particular piperazine or derivatives thereof, in particular those of the formula (IV)

(IV)

where y is H or an aminoalkyl radical, in particular aminoethyl.

Further preferred are polyamines of the formulae (V) and (VI):

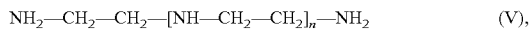

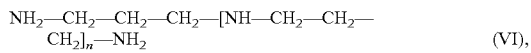

where n is 0 or an integer from 1 to 300.

Very particular preference is given to:

| Trivial name | Commercial name |
|---|---|
| EDA | ethylenediamine |
| DETA | diethylenetriamine |
| TETA | triethylenetetramine |
| TEPA | tetraethylenepentamine |
| PEHA | pentaethylenehexamine |
| HEHA | hexaethyleneheptamine | or higher amine mixtures which remain as distillation residue in the preparation of the above-mentioned substances, in particular PEHA or HEHA or TEPA.

As commercial products, the above-mentioned substances are, in terms of their chemical composition, usually mixtures of up to a few hundred individual components which differ in their boiling points. Preference is given to using EDA and PEHA, and very particular preference is given to PEHA.

The invention also provides a method of protecting metallic materials in strongly alkaline medium by means of a corrosion inhibitor, characterized in that the corrosion inhibitor contains an amine or a polyamine. The amines and polyamines suitable for this purpose have been mentioned above.

To prevent or drastically reduce the corrosion of metallic materials by alkaline media, from 0.001 ppm to 200 000 ppm of an amine is/are added to the alkaline medium. The addition takes place at temperatures of from 0 to 500° C. and pressures of from −1 to +1000 bar. Preference is given to an addition of from 0.1 ppm to 1000 ppm of an amine under pressures of from −1 to +15 bar and at temperatures of from 50 to 300° C. The aliquot of amine and the alkaline stream are mixed if necessary.

The amine is added continuously or discontinuously, and the processes are operated batchwise or continuously. Preference is given to the addition of the amine to an alkaline medium, in particular an alkaline medium having a pH of 13 or above. Particular preference is given to the addition of the amine to an aqueous sodium hydroxide solution having a concentration of from 5 to 95% by weight, in particular from 30 to 90% by weight, and a pH of >13.

All corrosion inhibitors described in the literature can in general be added to the corrosion inhibitor to improve the corrosion protection, as long as they do not contain any oxidants or react with the above-mentioned medium. In particular, substances having reducing properties can improve the effectiveness of the corrosion inhibitor.

The invention is illustrated but not restricted by the following examples which are based on experiment and in which the percentages quoted are by weight (% by weight).

EXAMPLES

Experimental Set-up

To measure the corrosion-inhibiting action, investigations were carried out in experimental vessels made of silver. The metal specimens were insulated from one another and from the experimental vessel by means of PTFE holders. The corrosion behaviour of various metals and alloys in highly concentrated $ClO_3^-$-free NaOH solutions, in $ClO_3^-$-containing NaOH solutions and in solutions containing both $ClO_3^-$ and amine was investigated. In the experiments in which the influence of additives on the corrosion behaviour of the materials used was to be determined, the content of these additives in the solution was monitored analytically and maintained at the initial level over the entire period of the experiment of 14 days by appropriate additions. The rate of removal of material from the surface of the metallic material in mm per annum (mm/a) was determined.

Example 1

The following experimental results were obtained in boiling 80% strength NaOH solutions (about 220° C.) without and with additions of chlorate (as sodium chlorate) and amine. In these experiments, welded specimens made of nickel (material No. 2.4068) and Inconel 600 (material No. 2.4816) were used.

| Experiment | Material | Test medium | Corrosion rate (mm/a) |
|---|---|---|---|
| 1. | Nickel | 80% strength NaOH | 0.10 |
| 2. | Inconel 600 | 80% strength NaOH | 0.10 |
| 3. | Nickel | 80% strength NaOH + 25 ppm of $ClO_3^-$ | 0.40 |
| 4. | Inconel 600 | 80% strength NaOH + 25 ppm of $ClO_3^-$ | 0.50 |
| 5. | Nickel | 80% strength NaOH + 25 ppm of $ClO_3^-$ + 300 ppm of PEHA | 0.03 |
| 6. | Inconel 600 | 80% strength NaOH + 25 ppm of $ClO_3^-$ + 300 ppm of PEHA | 0.03 |

The results show that the addition of PEHA to the $ClO_3^-$-containing sodium hydroxide solution leads to a reduction in the corrosion rates by more than one power of ten and that the corrosion rates measured can even be ⅔ lower than in the $ClO_3^-$-free sodium hydroxide solution.

Example 2

The following corrosion tests were carried out in an 80% strength NaOH melt (about 220° C.) with addition of 25 ppm of chlorate as $NaClO_3$, with further introduction of chlorate and monitoring of the chlorate content by analysis, under a blanket of nitrogen. The aim of the experiments was to determine the dependence of the corrosion rates of nickel (material No. 2.4068) on the PEHA concentration. In these experiments, welded specimens made of nickel (material No. 2.4068) were used.

| Experiment | Material | Test medium | Corrosion rate (mm/a) |
|---|---|---|---|
| 7. | Nickel | 80% strength NaOH + 25 ppm of $ClO_3^-$ | 0.40 |
| 8. | Nickel | 80% strength NaOH + 25 ppm of $ClO_3^-$ + 20 ppm of PEHA | 0.11 |
| 9. | Nickel | 80% strength NaOH + 25 ppm of $ClO_3^-$ + 50 ppm of PEHA | 0.05 |
| 10. | Nickel | 80% strength NaOH + 25 ppm of $ClO_3^-$ + 300 ppm of PEHA | 0.03 |

The results show that the addition of 300 ppm of PEHA to the $ClO_3^-$-containing sodium hydroxide solution leads to a reduction in the corrosion rates by more than one power of ten and that the addition of only 20 ppm of PEHA to the $ClO_3^-$-containing sodium hydroxide solution leads to a reduction in the corrosion rates by virtually ¾.

Example 3

The following corrosion test was carried out in an 80% strength NaOH melt (about 220° C.) with addition of 25 ppm of chlorate as $NaClO_3$ and 300 ppm of ethylenediamine, under a blanket of nitrogen, in a PTFE-lined high-pressure autoclave.

| Experiment | Material | Test medium | Corrosion rate (mm/a) |
|---|---|---|---|
| 11. | Nickel | 80% strength NaOH + 25 ppm of $ClO_3^-$ + 300 ppm of ethylenediamine | 0.04 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of protecting metallic materials in chlorate ion containing, sodium hydoxide solutions comprising: reducing the corrosive effects of the chlorate ions contacting the metallic materials by adding a polyamine to the chlorate ion containing, sodium hydroxide solution having a sodium hydroxide concentration of 5 to 95% by weight, and wherein the polyamine is selected from the group consisting of the reaction products of dichloroethane with ammonia and/or amines, or from the group consisting of the reaction products of ethylene oxide with ammonia or amines, or wherein the polyamine has one of the formulae (II) and (III) below:

$$H_p-N(CH_2-CH_2)_q-[NH_r-(CH_2-CH_2)_s]_n-NH_t \quad (II),$$

$$NH_2-CH_2-CH_2-CH_2-[NH_r-(CH_2-CH_2-CH_2)_s]_n-NH_2 \quad (III),$$

where
n is 0 or an integer from 1 to 300,
p, q, s and t are each 1 or 2, and
r is 0 or 1,
where the sum of the substituents on a nitrogen is three or an anion, additionally present to balance the charge when a nitrogen is bound to 4 substituents, or
wherein the polyamine has the formula (IV) below:

(IV)

where v is H or an aminoalkyl radical.

2. The method according to claim 1, wherein the polyamine has one of the formulae (V) and (VI) below:

$$NH_2-CH_2-CH_2-[NH-CH_2-CH_2]_n-NH_2 \quad (V),$$

$$NH_2-CH_2-CH_2-CH_2-[NH-CH_2-CH_2-CH_2]_n-NH_2 \quad (VI),$$

where n is 0 or an integer from 1 to 300.

* * * * *